United States Patent
Sato et al.

(10) Patent No.: US 9,042,025 B2
(45) Date of Patent: May 26, 2015

(54) EYEPIECE OPTICAL SYSTEM

(71) Applicant: FUJIFILM Corporation, Tokyo (JP)

(72) Inventors: Kenichi Sato, Saitama-ken (JP); Michio Cho, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/211,470

(22) Filed: Mar. 14, 2014

(65) Prior Publication Data

US 2014/0198391 A1 Jul. 17, 2014

Related U.S. Application Data

(63) Continuation of application No. PCT/JP2012/005708, filed on Sep. 10, 2012.

(30) Foreign Application Priority Data

Sep. 27, 2011 (JP) ................. 2011-210838

(51) Int. Cl.
| | |
|---|---|
| G02B 25/00 | (2006.01) |
| G02B 3/02 | (2006.01) |
| G02B 9/14 | (2006.01) |
| G02B 13/00 | (2006.01) |
| G02B 9/12 | (2006.01) |
| G02B 15/173 | (2006.01) |
| G02B 13/18 | (2006.01) |
| G02B 9/16 | (2006.01) |

(52) U.S. Cl.
CPC .............. *G02B 13/0035* (2013.01); *G02B 9/12* (2013.01); *G02B 9/14* (2013.01); *G02B 15/173* (2013.01); *G02B 13/18* (2013.01); *G02B 9/16* (2013.01); *G02B 25/001* (2013.01)

(58) Field of Classification Search
CPC ...... G02B 13/0035; G02B 13/18; G02B 9/12; G02B 25/001; G02B 15/173; G02B 9/14; G02B 9/16
USPC .................................. 359/643, 645, 716, 785
See application file for complete search history.

(56) References Cited

U.S. PATENT DOCUMENTS

2010/0290129 A1* 11/2010 Nishio et al. .................. 359/645

FOREIGN PATENT DOCUMENTS

| JP | 2002-048985 | 2/2002 |
|---|---|---|
| JP | 2007-264179 | 10/2007 |
| JP | 2010-175795 | 8/2010 |
| JP | 2010-266776 | 11/2010 |
| JP | 2012-068302 | 4/2012 |

OTHER PUBLICATIONS

International Search Report, PCT/JP2012/005708, Dec. 25, 2012.

* cited by examiner

*Primary Examiner* — Evelyn A Lester
(74) *Attorney, Agent, or Firm* — Young & Thompson

(57) ABSTRACT

In order from the object side, a first lens having positive power with a convex observation-side surface, a second lens having negative power and a meniscus shape with a concave object-side surface, and a third lens having positive power with an observation-side surface having a smaller radius of curvature than that of an object-side surface are provided. The first, second and third lenses are single lenses. The conditional expressions (1): $0.9<f1/f3<5.0$, (2): $10.0<TL<17.0$ and (3): $15.0<f<25.0$ are satisfied at the same time, where f1 is a focal length of the first lens, f3 is a focal length of the third lens, f is a focal length of the entire system, and TL is a distance along an optical axis from an object-side lens surface of the first lens to the observation-side lens surface of the third lens.

15 Claims, 5 Drawing Sheets

EXAMPLE 1

FIG.3

EXAMPLE 2

FIG.4

EXAMPLE 3

FIG.5

EXAMPLE 4

FIG.6

EXAMPLE 1

EXAMPLE 4

SPHERICAL ABERRATION a

ASTIGMATISM b

DISTORTION c

EYEPIECE OPTICAL SYSTEM

CROSS REFERENCE TO RELATED APPLICATIONS

This application is a continuation of PCT/JP2012/005708 filed on Sep. 10, 2012, which claims foreign priority to Japanese Application No. 2011-210838 filed on Sep. 27, 2011. The entire contents of each of the above applications are hereby incorporated by reference.

TECHNICAL FIELD

The present invention relates to an eyepiece optical system that is used to observe an image displayed on a display screen.

BACKGROUND ART

Viewfinders for use with video cameras, etc., to observe an enlarged image of an image displayed on a display screen with a naked eye are conventionally known. Such a viewfinder uses an eyepiece optical system for observing an enlarged image of a liquid crystal display screen. In recent years, more and more digital cameras use this type of viewfinders (which are also referred to as electronic viewfinder or EVF).

As a triplet eyepiece optical system usable with the above-described electronic viewfinders, eyepiece optical systems disclosed in Japanese Unexamined Patent Publication Nos. 2002-048985, 2007-264179, 2010-175795 and 2010-266776 (hereinafter, Patent Documents 1, 2, 3 and 4, respectively) etc., are proposed.

DISCLOSURE OF INVENTION

In order to accommodate a display screen to high pixel density (equivalent to high-definition television (HDTV), for example), it is necessary to increase the size of the display screen (to provide a diagonal dimension of the display screen of around 12 mm, for example) so that it can contain a given number of pixels. Further, an eyepiece optical system used to observe a high pixel density display screen is required to have smaller aberrations. Further, in order to achieve size reduction of a device, it is required to reduce the entire lens length, which is a distance (actual length) of the optical axis from the display screen to a most observation-side lens surface.

However, although an eyepiece optical system disclosed in Example 4 in Patent Document 1 is accommodated to a large display screen size, suppression of image plane curve is not sufficient, and is therefore not deemed to have optical performance applicable to observation of a high pixel density display screen. On the other hand, eyepiece optical systems disclosed in examples other than Example 4 in Patent Document 1 are intended to be applied to observation of a small display screen and are not applicable to observation of a large, high pixel density display screen.

An eyepiece optical system disclosed in Patent Document 2 has performance applicable to observation of a large, high pixel density display screen; however, the entire lens length thereof is too large to accommodate the size reduction of a device.

An eyepiece optical system disclosed in Patent Document 3 has a drawback of somewhat narrow angle of view.

An eyepiece optical system disclosed in Patent Document 4 has even narrower angle of view and larger entire lens length than those of the eyepiece optical system disclosed in Patent Document 3.

In view of the above-described circumstances, the present invention is directed to providing an eyepiece optical system that has suppressed aberrations, has wide angle of view and can achieve size reduction.

An eyepiece optical system of the invention substantially consists of, in order from the object side: a first lens having a positive refractive power with an observation-side (or the eye point-side, which is the side opposite from the object side) lens surface being a convex surface; a second lens having a negative refractive power and having a meniscus shape with a concave surface facing the object side; and a third lens having a positive refractive power and formed such that an observation-side lens surface has a smaller radius of curvature than a radius of curvature of an object-side lens surface, wherein each of the first lens, the second lens and the third lens consists of a single lens, and the conditional expression (1):

$$0.9 < f1/f3 < 5.0,$$

the conditional expression (2):

$$10.0 < TL < 17.0, \text{ and}$$

the conditional expression (3):

$$15.0 < f < 25.0$$

are satisfied at the same time, where f1 is a focal length of the first lens, f3 is a focal length of the third lens, f is a focal length of the entire lens system, and TL is a distance along an optical axis from an object-side lens surface of the first lens to the observation-side lens surface of the third lens.

It is desirable that the eyepiece optical system satisfies the conditional expression (1'):

$$1.0 < f1/f3 < 2.0.$$

It is desirable that the eyepiece optical system satisfies the conditional expression (4):

$$30.0° < 2\omega,$$

where $2\omega$ is a maximum angle of view (the unit is "degrees").

It should be noted that the maximum angle of view is a total angle of view in a direction in which the angle of view becomes the largest. For example, if an area to be observed by the eyepiece optical system has a quadrangular shape, an angle of view in a diagonal direction of the quadrangular area is the maximum angle of view.

It is desirable that the eyepiece optical system satisfies the conditional expression (5):

$$0.5 < (r5+r6)/(r5-r6) < 1.1, \text{ or}$$

it is more desirable that the eyepiece optical system satisfies the conditional expression (5'):

$$0.6 < (r5+r6)/(r5-r6) < 0.9,$$

where r5 is a radius of curvature of the object-side lens surface of the third lens, and r6 is a radius of curvature of the observation-side lens surface of the third lens.

It should be noted that each radius of curvature is provided with a positive or negative sign, where the positive sign indicates that the surface is convex toward the object side and the negative sign indicates that the surface is convex toward the observation side.

It is desirable that the observation-side lens surface of the third lens has an aspherical surface shape formed such that the positive refractive power is weaker at a position farther away from the optical axis passing through the third lens in a direction orthogonal to the optical axis.

It is desirable that the eyepiece optical system satisfies the conditional expression (6):

$$-6.0 < (r3+r4)/(r3-r4) < -2.3, \text{ or}$$

it is more desirable that the eyepiece optical system satisfies the conditional expression (6'):

$$-5.0 < (r3+r4)/(r3-r4) < -3.0,$$

where r3 is a radius of curvature of the object-side lens surface of the second lens, and r4 is a radius of curvature of an observation-side lens surface of the second lens.

It is desirable that the eyepiece optical system satisfies the conditional expression (7):

$$1.80 < N2, \text{ or}$$

it is more desirable that the eyepiece optical system satisfies the conditional expression (7'):

$$1.90 < N2,$$

where N2 is a refractive index of a lens material forming the second lens.

A viewfinder of the invention may include the above-described eyepiece optical system.

The viewfinder may be an electric viewfinder.

The viewfinder may be included in a digital camera.

The above-described eyepiece optical system substantially consists of three lenses. The expression "substantially consists (consisting) of n lenses" as used herein means that the eyepiece optical system may include, besides the n lenses: lenses substantially without any refractive power; optical elements other than lenses, such as stops, glass covers and filters; and mechanical components, such as lens flanges, lens barrels, imaging elements, and camera shake correcting mechanisms; etc.

The eye point of the eyepiece optical system is a position (position in lens design) along the optical axis where the eye is positioned for observing an object point to be observed through the eyepiece optical system.

In cases where an aspherical surface is included in lens surfaces forming the eyepiece optical system, a concave or convex shape of the aspherical surface, a positive or negative refractive power of the aspherical surface, and a positive or negative radius of curvature of the aspherical surface are defined by those of the paraxial region of the aspherical surface.

According to the invention, the eyepiece optical system substantially consists of, in order from the object side: a first lens having a positive refractive power with an observation-side lens surface being a convex surface; a second lens having a negative refractive power and having a meniscus shape with a concave surface facing the object side; and a third lens having a positive refractive power and formed such that an observation-side lens surface has a smaller radius of curvature than a radius of curvature of an object-side lens surface, wherein each of the first lens, the second lens and the third lens consists of a single lens, and the conditional expression (1):

$$0.9 < f1/f3 < 5.0,$$

the conditional expression (2):

$$10.0 < TL < 17.0, \text{ and}$$

the conditional expression (3):

$$15.0 < f < 25.0$$

are satisfied at the same time. Therefore, the eyepiece optical system has suppressed aberrations, has wide angle of view and can achieve size reduction.

That is, according to the above-described eyepiece optical system of the invention, the sum of thicknesses of the three lenses and the sum of air spaces between the lenses can be reduced without increasing aberrations, thereby reducing the entire lens length. This facilitates ensuring a space for moving the lenses for diopter correction, i.e., ensuring, for example, an air space from the object point (display screen) to the object-side surface of the first lens, thereby facilitating lens design that allows the diopter correction.

This also facilitates ensuring a necessary distance from the observation-side lens surface of the third lens to the eye point for visual observation, thereby facilitating appropriate positioning the eye point. Thus, an eyepiece optical system having wide angle of view, suppressed aberrations and a short entire lens length can be accomplished more easily. This facilitates accomplishing a compact eyepiece optical system having optical performance applicable to observation of a display screen with the number of pixels equivalent to high-definition television (HDTV), for example.

It should be noted that the space (air space) along the optical axis for moving the lenses for diopter correction may hereinafter be referred to as "diopter correction space".

Also, the distance (equivalent air distance) from the observation-side lens surface of the third lens to the eye point may hereinafter be referred to as "eye point distance".

The conditional expression (1) defines the range of ratio between the focal length of the first lens and the focal length of the third lens. If the eyepiece optical system is configured such that the lower limit of the conditional expression (1) is not reached, it is difficult to suppress aberrations (in particular, spherical aberration and image plane curve) while ensuring a given eye point distance (for example, around 20 mm). On the other hand, if the eyepiece optical system is configured such that the upper limit of the conditional expression (1) is exceeded, the refractive power is excessively distributed on the third lens and this results in worsening of astigmatism and other aberrations.

The conditional expression (2) defines the range of interval from the object-side lens surface of the first lens to the observation-side lens surface of the third lens. If the lower limit of the conditional expression (2) is not reached, it is impossible to provide a sufficient thickness of each lens and a sufficient air space between the lenses, and therefore it is impossible to achieve sufficient correction of image plane curve. If the upper limit of the conditional expression (2) is exceeded, it is difficult to ensure a given diopter correction space while maintaining the optical performance.

The conditional expression (3) defines the range of focal length of the entire lens system. If the lower limit of the conditional expression (3) is not reached, the eyepiece optical system has excessively high magnification, and this is not preferable since dust on an observed surface, a glass cover, or the like, is highly visible. Further, if the focal length is reduced while keeping the same pupil radius, F-number (F No.) of the entire lens system becomes small (bright), and it is difficult to achieve correction of spherical aberration. If the upper limit of the conditional expression (3) is exceeded, the eyepiece optical system has excessively low magnification. In this case, a large display screen is necessary to maintain wide angle of view, and therefore the entire lens length increases and the device cost also increases.

DESCRIPTION OF PREFERRED EMBODIMENTS

Hereinafter, an eyepiece optical system of the present invention will be described with reference to the drawings.

Figure 1:
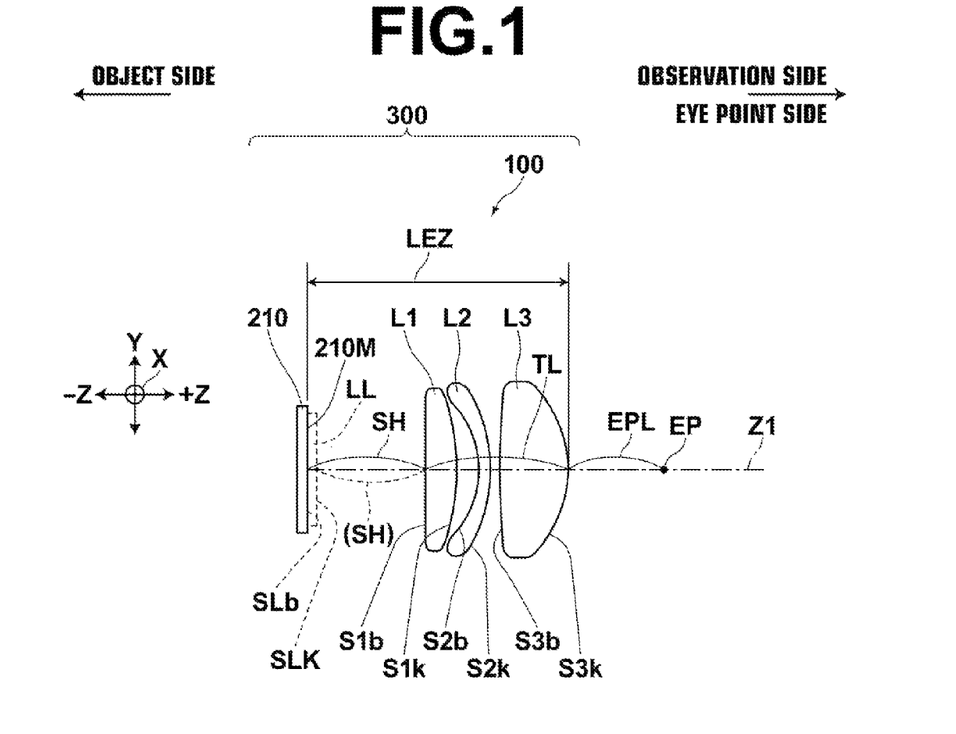
FIG. 1 is a sectional view illustrating the schematic configuration of an eyepiece optical system according to an embodiment of the invention.

FIG. 1 is a sectional view illustrating the schematic configuration of an electronic viewfinder including the eyepiece optical system of the invention. It should be noted that the arrows X, Y and Z in FIG. 1 indicate three directions that are orthogonal to one another, and the direction of the arrow Z is the same as the direction of an optical axis Z1.

An electronic viewfinder 300 shown in FIG. 1 includes an image display section 210 and an eyepiece optical system 100. The electronic viewfinder 300 is used to observe an enlarged image of an image displayed on a display screen 210M of the image display section 210 with a naked eye.

The electronic viewfinder 300 is used, for example, with a digital camera. As shown in the drawing, the image display section 210 is disposed on the object side (the side indicated by the arrow −Z in the drawing) of the eyepiece optical system 100, and an eye point EP for observing an image displayed on the display screen 210M of the image display section 210 through the eyepiece optical system 100 is positioned on the observation side (the side indicated by the arrow +Z in the drawing) of the eyepiece optical system 100.

The eye point EP is a position of the eye during visual observation of an image formed on the display screen 210M through the eyepiece optical system 100. As the image display section 210, a liquid crystal display device, or the like, can be used.

The eyepiece optical system 100 includes, in order from the object side: a first lens L1 having a positive refractive power with an observation-side (the eye point-side, which is opposite from the object side) lens surface S1$k$ being a convex surface; a second lens L2 having a negative refractive power and having a meniscus shape with the concave surface facing the object side; and a third lens L3 having a positive refractive power and formed such that an observation-side lens surface S3$k$ has a smaller absolute value of a radius of curvature than that of an object-side lens surface S3$b$, wherein each of the first lens L1, the second lens L2 and the third lens L3 consists of a single lens.

Further, the eyepiece optical system 100 satisfies the conditional expression (1):

$0.9 < f1/f3 < 5.0$, the conditional expression (2):

$10.0 < TL < 17.0$, and the conditional expression (3):

$15.0 < f < 25.0$ at the same time, where f1 is a focal length of the first lens, f3 is a focal length of the third lens, f is a focal length of the entire system, and TL is a distance along the optical axis Z1 from an object-side lens surface S1$b$ of the first lens L1 to the observation-side lens surface S3$k$ of the third lens L3.

It should be noted that the eyepiece optical system 100 may include a glass cover, a filter, or the like, which is a parallel plate LL closely disposed on the display screen 210M of the image display section 210. FIG. 1 shows a state where an object-side surface SL$b$ of the parallel plate LL is closely disposed on the display screen 210M.

Further, the eyepiece optical system 100 may be configured to satisfy the conditional expression (4):

$30.0° < 2\omega$, where $2\omega$ is an angle of view (a total angle of view; the unit is "degrees").

The conditional expression (4) defines the range of the angle of view. When the conditional expression (4) is satisfied, a wider angle of view can be provided.

Further, the eyepiece optical system 100 may be configured to satisfy the conditional expression (5):

$0.5 < (r5+r6)/(r5−r6) < 1.1$, or more desirably satisfy the conditional expression (5'):

$0.6 < (r5+r6)/(r5−r6) < 0.9$, where r5 is a radius of curvature of the object-side lens surface S$i$b of the third lens L3, and r6 is a radius of curvature of the observation-side lens surface S3$k$ of the third lens L3. It should be noted that each radius of curvature is provided with a positive or negative sign, where the positive sign indicates that the surface is convex toward the object side (in the direction of the arrow −Z in the drawing) and the negative sign indicates that the surface is convex toward the observation side (in the direction of the arrow +Z in the drawing).

The conditional expression (5) defines the shape of the third lens L3. If the lower limit of the conditional expression (5) is not reached, principal points of the third lens L3 are shifted toward the object side, and it is difficult to suppress aberrations while ensuring a sufficient eye point distance EPL (a distance along the optical axis Z1 from the observation-side lens surface S3$k$ of the third lens L3 to the eye point EP). If the upper limit of the conditional expression (5) is exceeded, the power of the observation-side lens surface S3$k$ of the third lens L3 is excessively strong and this results in worsening of astigmatism and spherical aberration.

Further, the eyepiece optical system 100 may satisfy the conditional expression (6):

$−6.0 < (r3+r4)/(r3−r4) < −2.3$, or more desirably satisfy the conditional expression (6'):

$−5.0 < (r3+r4)/(r3−r4) < −3.0$, where r3 is a radius of curvature of an object-side lens surface S2$b$ of the second lens L2, and r4 is a radius of curvature of an observation-side lens surface S2$k$ of the second lens L2.

The conditional expression (6) defines the shape of the second lens L2. If the lower limit of the conditional expression (6) is not reached, the power of the object-side lens surface S2$b$ of the second lens L2 is excessively strong and this results in worsening of spherical aberration. If the upper limit of the conditional expression (6) is exceeded, it is difficult to suppress aberrations while ensuring a wide angle of view and a long eye point distance EPL.

Further, it is desirable that the eyepiece optical system 100 satisfies the conditional expression (7):

1.80<N2, or it is more desirable that the eyepiece optical system 100 satisfies the conditional expression (7'):

1.90<N2, where N2 is a refractive index of a material forming the second lens L2.

The conditional expression (7) defines the refractive index of the second lens L2. If the lower limit of the conditional expression (7) is not reached, it is necessary to provide a small radius of curvature of the object-side lens surface S2b of the second lens L2 to achieve correction of aberrations, such as image plane curve, distortion, etc. In this case, however, thickness of the second lens L2 is increased and workability thereof is worsened, resulting in cost increase.

Further, it is desirable that each of the first lens L1 and the second lens L2 of the eyepiece optical system 100 is formed by a glass lens having spherical surfaces on both sides. In this case, degradation of an image (an image displayed on the display screen 210M observed through the eyepiece optical system 100) that is observed during visual observation from a position out of a predetermined correct position (normal pupil position) is smaller than that in a case where aspherical lenses are used as the first lens L1 and the second lens L2.

Since plastic lenses have lower surface precision than that of glass lenses, lowering of contrast of the observed image during the visual observation can be reduced in a case where glass lenses are used as the first lens L1 and the second lens L2 from that in a case where plastic lenses are used as the first lens L1 and the second lens L2.

Further, the observation-side lens surface S3k of the third lens L3 may have an aspherical surface shape that is formed such that the positive refractive power is weaker at a position farther away from the optical axis Z1 passing through the third lens L3 in a direction orthogonal to the optical axis (for example, the direction of the arrow X or the arrow Y in the drawing). That is, according to the lens configuration of the eyepiece optical system 100 of the invention, the observation-side lens surface S3k of the third lens L3 has a smaller radius of curvature (stronger power) than that of the object-side lens surface S3b of the third lens L3. By making the lens surface S3k having stronger power have the aspherical surface shape as described above, successful correction of spherical aberration and astigmatism of the eyepiece optical system 100 can be achieved.

It should be noted that, in FIG. 1, a length (actual length) along the optical axis Z1 from the display screen 210M to the observation-side lens surface S3k of the third lens L3, which is the most observation-side lens surface, is an entire lens length LEZ.

In a case where the parallel plate LL is not provided, an air space between the object-side lens surface S3b of the first lens L1 and the display screen 210M corresponds to a diopter correction space SH. In the case where the parallel plate LL is provided, an air space between the object-side lens surface S3b of the first lens L1 and the observation-side surface SLk of the parallel plate LL corresponds to the diopter correction space (SH).

The diopter correction space SH is a space usable to achieve diopter correction by moving the first lens L1, the second lens L2 and the third lens L3 together along the direction of the optical axis Z1 without changing the positional relationship among the first lens L1, the second lens L2 and the third lens L3.

EXAMPLES

Next, Examples 1 to 4 showing specific numerical data of the eyepiece optical system according to the invention are described with reference to FIGS. 2 to 5 and FIGS. 6 to 9, and Tables 1A, 1B, 1C, . . . 4A, 4B and 4C. It should be noted that reference symbols used in FIGS. 2 to 5 that are the same as those used in FIG. 1 showing the above-described eyepiece optical system 100 denote corresponding constituent elements among the figures.

Example 1

Figure 2:
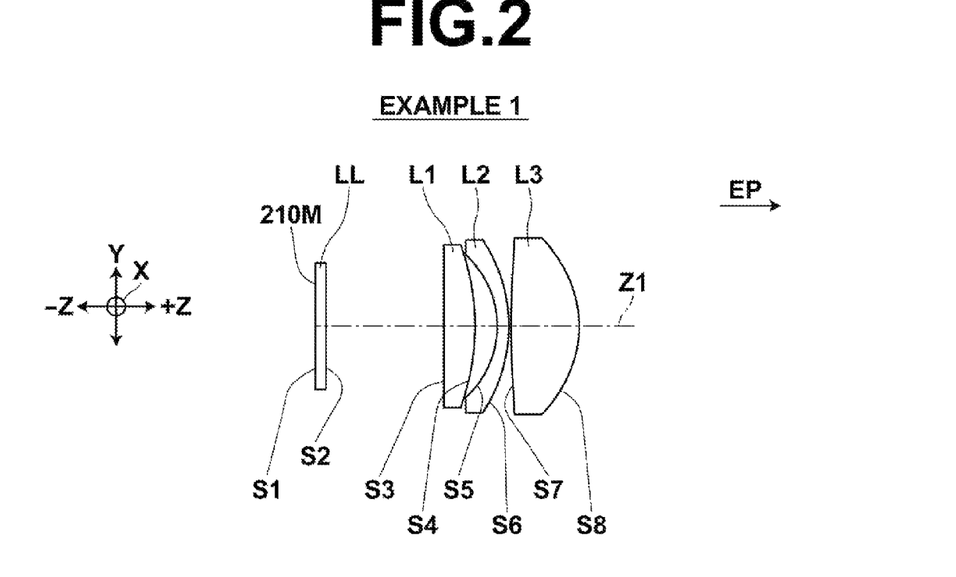
FIG. 2 is a sectional view illustrating the schematic configuration of an eyepiece optical system of Example 1 of the invention.

FIG. 2 is a sectional view illustrating the schematic configuration of an eyepiece optical system of Example 1.

Table 1A below shows lens data about the eyepiece optical system of Example 1. In the lens data shown in Table 1A, the surface number i represents the surface number of an i-th (i=1, 2, 3, . . . ) surface Si, where the most object-side surface is the 1st surface and the number is sequentially increased toward the image side. It should be noted that, in the lens data shown in Table 1A, the surface numbers are assigned to the surfaces including the surfaces of the optical element LL and the display screen 210M of the image display section 210, which have no power. More specifically, in Example 1 and Examples 3 and 4, which will be described later, the object-side surface of the optical element LL is in the same position as the display screen 210M. It should be noted that the optical element LL is not provided in Example 2, which will be described later.

In Table 1A, the symbol Ri represents a radius of curvature of the i-th (i=1, 2, 3, . . . ) surface, and the symbol Di represents a surface interval between the i-th (i=1, 2, 3, . . . ) surface and the i+1-th surface along the optical axis Z1. The number of the symbol Ri and the number of the symbol Di correspond to that of the symbol Si (i=1, 2, 3, . . . ) representing the lens surface, etc.

Further, in Table 1A, the symbol Ndj represents a refractive index with respect to the d-line (the wavelength of 587.6 nm) of a j-th (j=1, 2, 3, . . . ) optical element, where the most object-side optical element is the 1st optical element and the number is sequentially increased toward the image side, and the symbol vdj represents an Abbe number with respect to the d-line of the j-th optical element. In Table 1A, the unit of the radius of curvature and the surface interval is "millimeter". A positive value of the radius of curvature indicates that the surface is convex toward the object side, and a negative value of the radius of curvature indicates that the surface is convex toward the image side.

It should be noted that, in general, optical systems like the one described above can maintain given performance even when dimensions of optical elements, such as lenses, are proportionally enlarged or reduced. Therefore, an eyepiece optical system having a configuration obtained by proportionally enlarging or reducing the above-described entire lens data can also be regarded as an example of the invention.

It should be noted that, in the lens data shown in Table 1A, each aspherical surfaces is indicated by the symbol "*" added to the surface number thereof, and the value of the radius of curvature Ri of each aspherical surface is the value of the paraxial radius of curvature.

TABLE 1A

Example 1 Lens Data

| Surface No. (i) | Radius of Curvature Ri | Surface Interval Di | Ndj | vdj | Lens Material |
|---|---|---|---|---|---|
| 1 | ∞ | 1.00 | 1.51680 | 64.20 | |
| 2 | ∞ | 11.21 | | | |
| 3 | ∞ | 3.00 | 1.71300 | 53.94 | glass |
| 4 | −22.5376 | 2.11 | | | |
| 5 | −9.2000 | 1.10 | 1.92286 | 18.90 | glass |
| 6 | −14.9124 | 0.20 | | | |
| *7 | 70.9614 | 6.50 | 1.49023 | 57.45 | resin |
| *8 | −10.7119 | | | | |

*indicates an aspherical surface

Table 1B below shows aspherical coefficients for defining the shape of each aspherical surface forming the eyepiece optical system of Example 1. That is, Table 1B shows aspherical coefficients of the aspherical surface indicated by each surface number with the symbol "*" added thereto in Table 1A.

The aspherical coefficients shown in Table 1B are generated such that an aspherical surface shape is defined when they are applied to the aspherical surface equation below:

$$Z = C \cdot h^2 / \{1 + (1 - KA \cdot C^2 \cdot h^2)^{1/2}\} + \Sigma An \cdot h^n,$$

where Z is a depth (mm) of the aspherical surface, h is a distance (height) (mm) from the optical axis to the lens surface, KA is an aspherical coefficient representing a quadric surface, C is a paraxial curvature=1/R (1/mm) (R: a paraxial radius of curvature (mm)), and An is an aspherical coefficient of the n-th order (n is an integer of 3 or more).

TABLE 1B

Example 1 Aspherical Coefficients

| Surface No. *7 | |
|---|---|
| KA | 5.76439E+01 |
| A4 | −5.62831E−05 |
| A6 | 6.75349E−07 |
| A8 | −1.50339E−08 |
| A10 | 2.87531E−11 |
| Surface No. *8 | |
| KA | −2.11333E+00 |
| A4 | −2.43312E−04 |
| A6 | 1.68224E−06 |
| A8 | −1.56038E−08 |
| A10 | 6.40509E−11 |
| A12 | −3.21126E−13 |
| A14 | 1.33351E−15 |

Table 1C below shows values, etc., relating to the above-described conditional expressions (1) to (7) of the eyepiece optical system of Example 1, which are values corresponding to the mathematical expressions and the variables. These values can be found based on the lens data shown in Table 1, etc.

Variables f1, f2 and f3 represent focal lengths of the first lens L1, the second lens L2 and the third lens L3, respectively. A variable Yt represents a half diagonal length (a ½ length of the diagonal length) of the display screen 210M, and a variable EPL represents an eye point distance (a distance from the observation-side lens surface of the third lens L3 to the eye point EP).

As can be seen from Table 1C, the eyepiece optical system of Example 1 is configured to satisfy all the conditional expressions (1) to (7). Also, eyepiece optical systems of Examples 2 to 4 are configured to satisfy all the conditional expressions (1) to (7).

TABLE 1C

Example 1 Values Relating to Conditional Expressions, etc.

| Conditional Expression | Mathematical Expression/Variable | Value |
|---|---|---|
| (1) | f1/f3 | 1.621026 |
| (2) | TL | 12.91 |
| (3) | f | 20.8 |
| (4) | 2ω | 32.72 |
| (5) | (r5 + r6)/(r5 − r6) | 0.7377 |
| (6) | (r3 + r4)/(r3 − r4) | −4.22 |
| (7) | N2 | 1.92286 |
| — | f1 | 31.61 |
| — | f2 | −28.67 |
| — | f3 | 19.5 |
| — | Yt | 6 |
| — | EPL | 20.7 |

Figure 6:
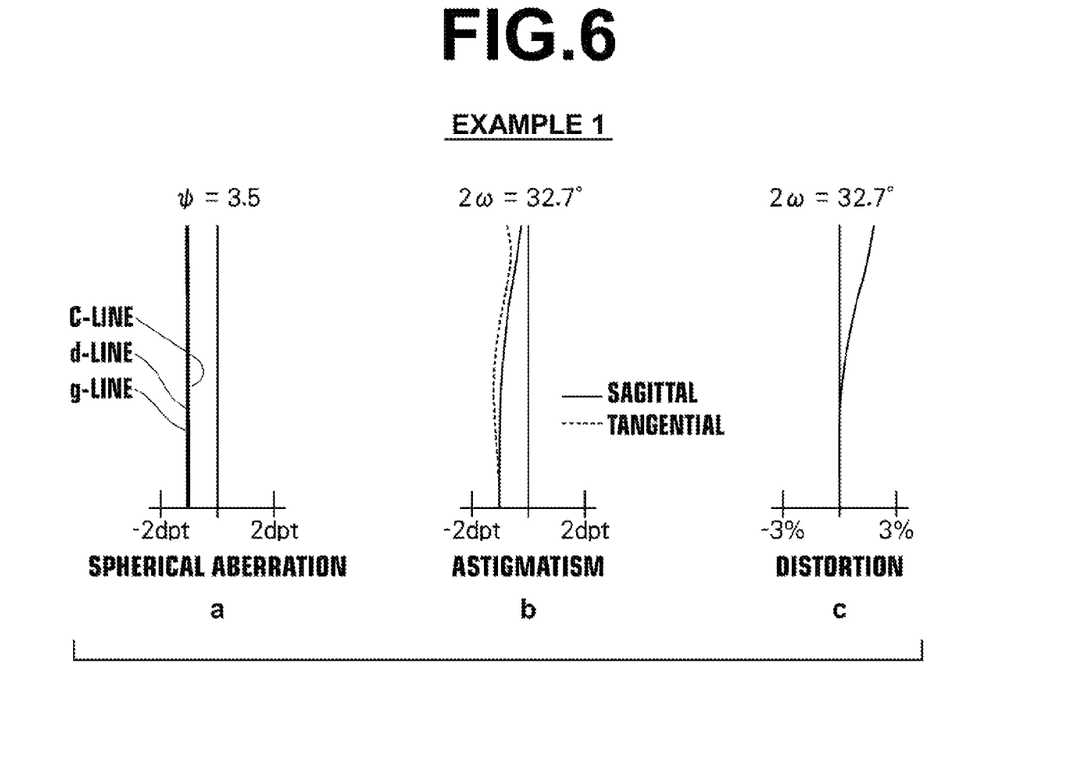
FIG. 6 shows aberration diagrams showing various aberrations of the eyepiece optical system of Example 1 of the invention.

FIG. 6 shows aberration diagrams of the eyepiece optical system of Example 1. In FIG. 6, the diagram shown at "a" shows spherical aberration, the diagram shown at "b" shows astigmatism, and the diagram shown at "c" shows distortion. It should be noted that the abscissa axis of each of the diagrams of spherical aberration and astigmatism shown at "a" and "b" represents diopter, where −1 diopter is the reference position in design.

That is, the eyepiece optical system of Example 1 achieves the diopter correction by changing the air space between the parallel plate LL and the first lens L1 (change within a predetermined range of the diopter correction space). The lens data shown in Table 1A above and the aberration diagrams shown in FIG. 6 show data and aberrations when the air space (the surface interval shown at the position corresponding to the surface number "2" in the lens data shown in Table 1A) is defined such that −1 diopter is provided by the diopter correction.

The diagram shown at "a" in FIG. 6 shows spherical aberration about individual light rays having wavelengths corresponding to the g-line, the d-line and the C-line. As shown at "a" in FIG. 6, variation among the spherical aberrations that occur depending on the image height with respect to the light rays of the individual wavelengths is very small and the spherical aberrations are substantially the same. More specifically, in the diagram shown at "a" in FIG. 6, the line representing the spherical aberration with respect to the g-line, the line representing the spherical aberration with respect to the d-line, and the line representing the spherical aberration with respect to the C-line are shown side by side in this order from the left side to the right side of the drawing, and they appear substantially the same.

It should be noted that, in the diagram showing astigmatism shown at "b" in FIG. 6, aberration in the sagittal direction is shown in the solid line and aberration in the tangential direction is shown in the dashed line.

The text "ψ=3.5" shown above the diagram showing spherical aberration shown at "a" in FIG. 6 means that the pupil radius is 3.5 mm, and the text "2ω=32.7°" shown above the diagrams shown at "b" and "c" in FIG. 6 means that the angle of view (total angle of view) is 32.7°.

As can be seen from the above-described lens data, etc., the eyepiece optical system of Example 1 accomplishes a compact eyepiece optical system with a wide angle of view and suppressed aberrations.

How to read FIG. 2 showing the configuration of the eyepiece optical system of Example 1, FIG. 6 showing the aberrations, Table 1A showing the lens data, Table 1B showing the aspherical coefficients, and Table 1C about the conditional expressions described above also applies to the figures and tables with respect to Examples 2 to 4, which will be described later, and therefore these explanations are not repeated in the following description of Examples 2 to 4.

Example 2

Figure 3:
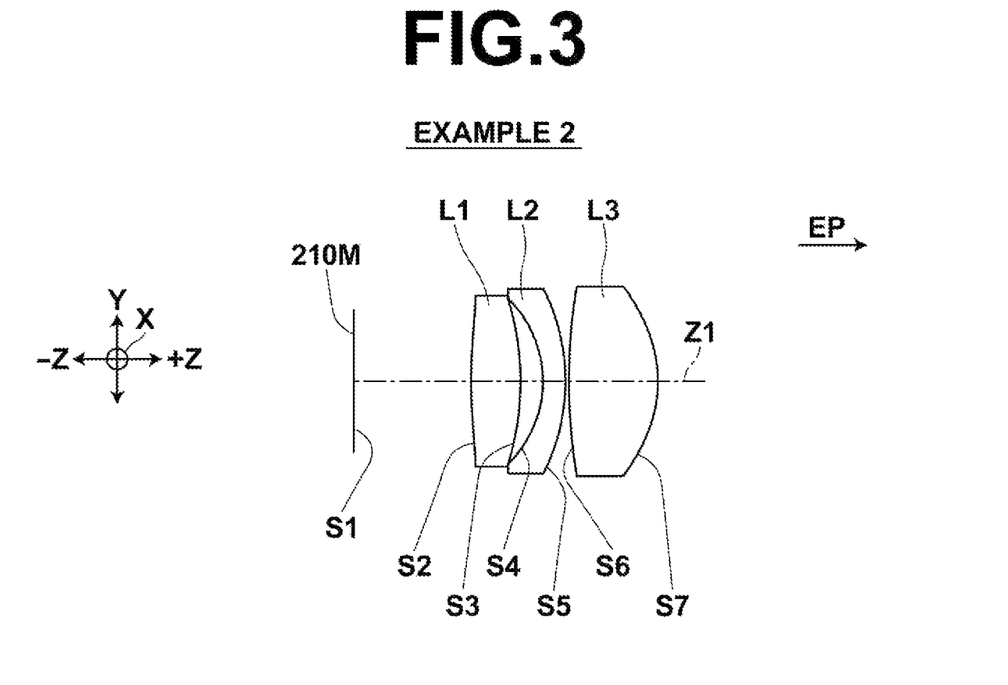
FIG. 3 is a sectional view illustrating the schematic configuration of an eyepiece optical system of Example 2 of the invention.
Figure 7:
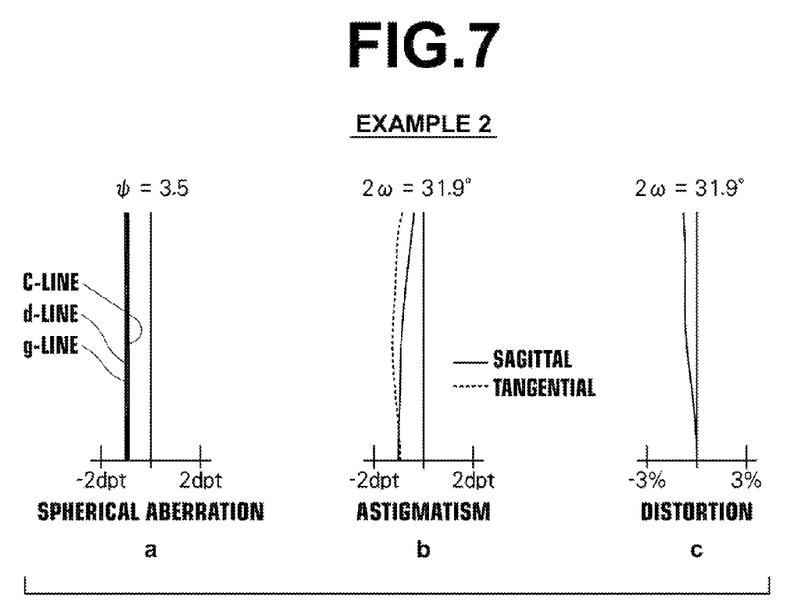
FIG. 7 shows aberration diagrams showing various aberrations of the eyepiece optical system of Example 2 of the invention.

FIG. 3 is a sectional view illustrating the schematic configuration of an eyepiece optical system of Example 2. FIG. 7 shows aberration diagrams of the eyepiece optical system of Example 2.

Table 2A below shows lens data, Table 2B below shows aspherical coefficients, and Table 2C below shows values relating to the conditional expressions of the eyepiece optical system of Example 2.

The eyepiece optical system of Example 2 is also configured to satisfy all the conditional expressions (1) to (7).

The eyepiece optical system of Example 2 is not provided with the parallel plate LL, and the diopter correction is achieved by changing the air space between the display screen 210M and the first lens L1.

The lens data shown in Table 2A and the aberration diagrams shown in FIG. 7 show data and aberrations when the air space (the surface interval shown at the position corresponding to the surface number "1" in the lens data shown in Table 2A) is defined such that −1 diopter is provided by the diopter correction.

TABLE 2A

Example 2 Lens Data

| Surface No. (i) | Radius of CurvatureRi | Surface Interval Di | Ndj | vdj | Lens Material |
|---|---|---|---|---|---|
| 1 |  | 9.90 |  |  |  |
| *2 | 40.0000 | 4.20 | 1.49023 | 57.45 | resin |
| 3 | −23.6361 | 1.88 |  |  |  |
| 4 | −9.8000 | 1.90 | 1.92286 | 18.90 | glass |
| 5 | −17.2872 | 0.30 |  |  |  |
| 6 | 49.2384 | 7.50 | 1.49023 | 57.45 | resin |
| *7 | −11.1491 |  |  |  |  |

*indicates an aspherical surface

TABLE 2B

Example 2 Aspherical Coefficients

| Surface No. *2 | |
|---|---|
| KA | −3.19508E+00 |
| A4 | −1.33813E−04 |
| A6 | 3.18941E−06 |
| A8 | −6.90251E−08 |
| A10 | 3.67715E−10 |
| Surface No. *7 | |
| KA | −3.71211E−01 |
| A4 | −4.45385E−05 |
| A6 | 9.51759E−08 |
| A8 | −2.24678E−09 |
| A10 | 1.54437E−11 |

TABLE 2C

Example 2 Values Relating to Conditional Expressions, etc.

| Conditional Expression | Mathematical Expression/Variable | Value |
|---|---|---|
| (1) | f1/f3 | 1.60269 |
| (2) | TL | 15.78 |
| (3) | f | 20.79 |
| (4) | 2ω | 31.94 |
| (5) | (r5 + r6)/(r5 − r6) | 0.631 |
| (6) | (r3 + r4)/(r3 − r4) | −3.62 |
| (7) | N2 | 1.92286 |
| — | f1 | 30.98 |
| — | f2 | −27.92 |
| — | f3 | 19.33 |
| — | Yt | 6 |
| — | EPL | 20.7 |

As can be seen from the above-described lens data, etc., the eyepiece optical system of Example 2 also accomplishes a compact eyepiece optical system with a wide angle of view and suppressed aberrations.

Example 3

Figure 4:
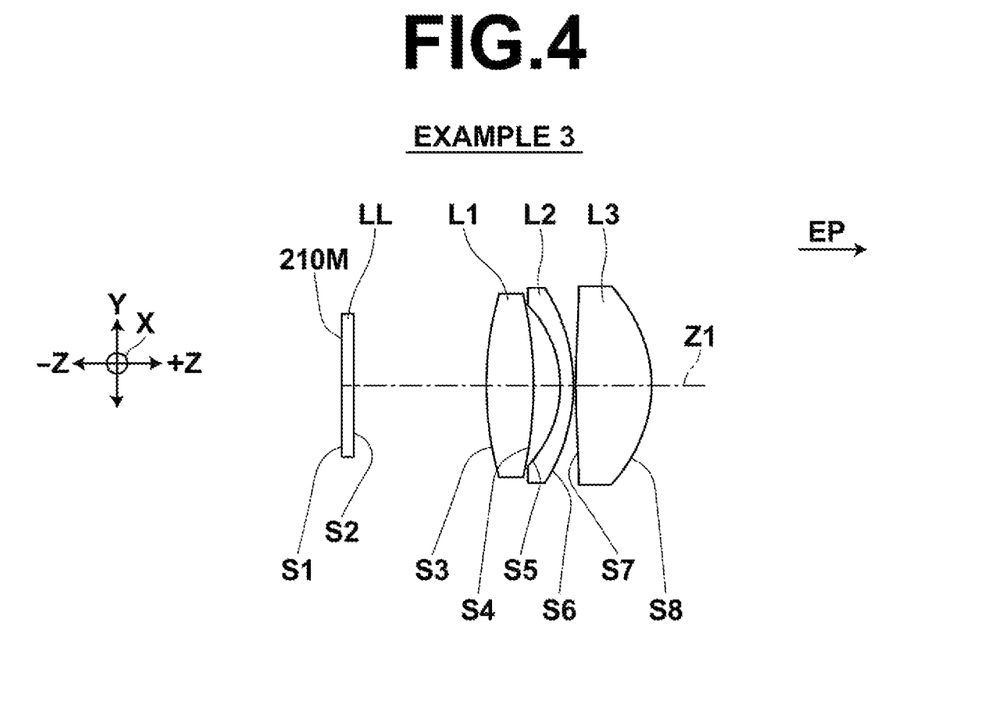
FIG. 4 is a sectional view illustrating the schematic configuration of an eyepiece optical system of Example 3 of the invention.
Figure 8:
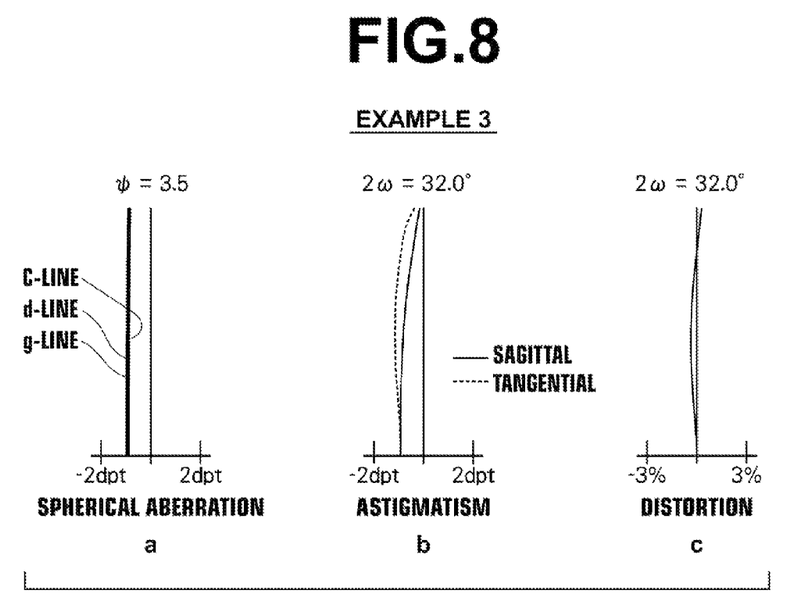
FIG. 8 shows aberration diagrams showing various aberrations of the eyepiece optical system of Example 3 of the invention.

FIG. 4 is a sectional view illustrating the schematic configuration of an eyepiece optical system of Example 3. FIG. 8 shows aberration diagrams of the eyepiece optical system of Example 3.

Table 3A below shows lens data, Table 3B below shows aspherical coefficients, and Table 3C below shows values relating to the conditional expressions of the eyepiece optical system of Example 3.

The eyepiece optical system of Example 3 is also configured to satisfy all the conditional expressions (1) to (7).

The eyepiece optical system of Example 3 is provided with the parallel plate LL, and the diopter correction is achieved by changing the air space between the parallel plate LL and the first lens L1.

The lens data shown in Table 3A and the aberration diagrams shown in FIG. 8 show data and aberrations when the air space (the surface interval shown at the position corresponding to the surface number "2" in the lens data shown in Table 3A) is defined such that −1 diopter is provided by the diopter correction.

TABLE 3A

Example 3 Lens Data

| Surface No. (i) | Radius of Curvature Ri | Surface Interval Di | Ndj | vdj | Lens Material |
|---|---|---|---|---|---|
| 1 | ∞ | 1.00 | 1.49023 | 57.45 |  |
| 2 | ∞ | 11.20 |  |  |  |
| 3 | 28.0000 | 4.00 | 1.49023 | 57.45 | resin |
| 4 | −34.9964 | 2.26 |  |  |  |
| 5 | −9.8000 | 1.10 | 1.92286 | 18.90 | glass |
| 6 | −15.3855 | 0.20 |  |  |  |
| *7 | 59.8667 | 6.40 | 1.49023 | 57.45 | resin |
| *8 | −11.3205 |  |  |  |  |

*indicates an aspherical surface

TABLE 3B

Example 3 Aspherical Coefficients

Surface No. *7

| | |
|---|---|
| KA | 3.72829E+01 |
| A4 | −1.47012E−04 |
| A6 | 2.53539E−06 |
| A8 | −4.16017E−08 |
| A10 | 1.90525E−10 |

Surface No. *8

| | |
|---|---|
| KA | −1.089157E+00 |
| A4 | −1.622526E−04 |
| A6 | 1.502165E−06 |
| A8 | −2.207009E−08 |
| A10 | 9.714352E−11 |

TABLE 3C

Example 3 Values Relating to Conditional Expressions, etc.

| Conditional Expression | Mathematical Expression/Variable | Value |
|---|---|---|
| (1) | f1/f3 | 1.61969 |
| (2) | TL | 13.96 |
| (3) | f | 21 |
| (4) | 2ω | 31.97 |
| (5) | (r5 + r6)/(r5 − r6) | 0.682 |
| (6) | (r3 + r4)/(r3 − r4) | −4.51 |
| (7) | N2 | 1.92286 |
| — | f1 | 32.41 |
| — | f2 | −32.3 |
| — | f3 | 20.01 |
| — | Yt | 6 |
| — | EPL | 20.7 |

As can be seen from the above-described lens data, etc., the eyepiece optical system of Example 3 also accomplishes a compact eyepiece optical system with a wide angle of view and suppressed aberrations.

Example 4

Figure 5:
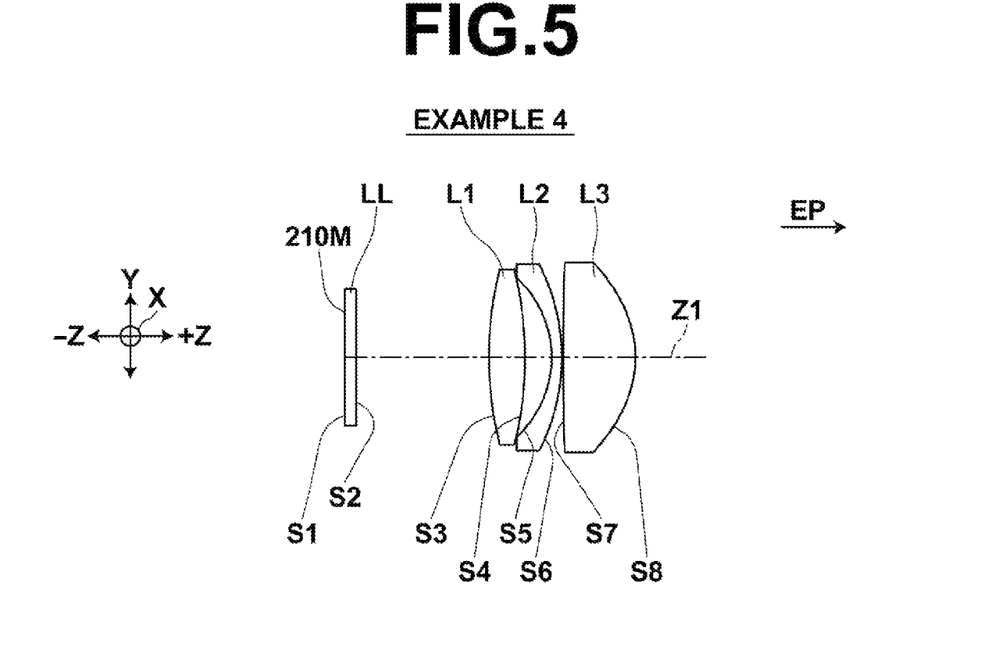
FIG. 5 is a sectional view illustrating the schematic configuration of an eyepiece optical system of Example 4 of the invention.
Figure 9:
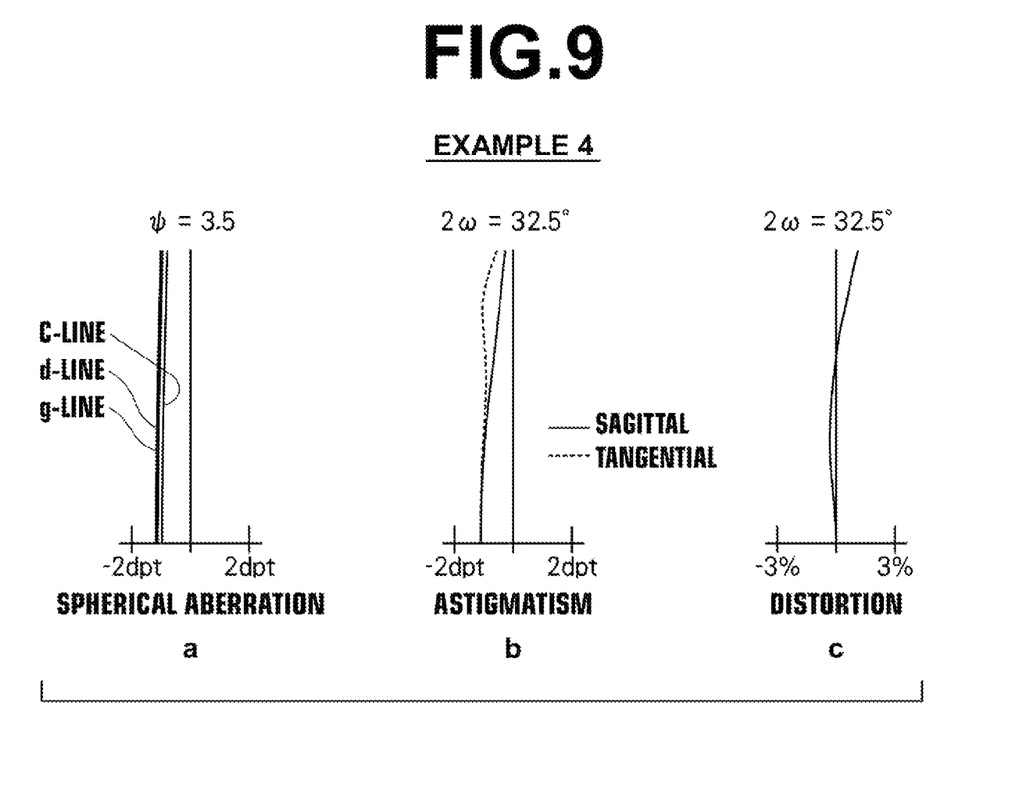
FIG. 9 shows aberration diagrams showing various aberrations of the eyepiece optical system of Example 4 of the invention.

FIG. 5 is a sectional view illustrating the schematic configuration of an eyepiece optical system of Example 4. FIG. 9 shows aberration diagrams of the eyepiece optical system of Example 4.

Table 4A below shows lens data, Table 4B below shows aspherical coefficients, and Table 4C below shows values relating to the conditional expressions of the eyepiece optical system of Example 4.

The eyepiece optical system of Example 4 is also configured to satisfy all the conditional expressions (1) to (7).

The eyepiece optical system of Example 4 is provided with the parallel plate LL, and the diopter correction is achieved by changing the air space between the parallel plate LL and the first lens L1.

The lens data shown in Table 4A and the aberration diagrams shown in FIG. 9 show data and aberrations when the air space (the surface interval shown at the position corresponding to the surface number "2" in the lens data shown in Table 4A) is defined such that −1 diopter is provided by the diopter correction.

TABLE 4A

Example 4 Lens Data

| Surface No. (i) | Radius of Curvature Ri | Surface Interval Di | Ndj | vdj | Lens Material |
|---|---|---|---|---|---|
| 1 | ∞ | 1.00 | 1.49023 | 57.45 | |
| 2 | ∞ | 11.74 | | | |
| 3 | 32.0687 | 3.20 | 1.62299 | 58.16 | glass |
| 4 | −32.0687 | 2.34 | | | |
| 5 | −9.5518 | 0.90 | 1.84666 | 23.78 | glass |
| 6 | −17.9900 | 0.10 | | | |
| *7 | 120.0000 | 6.40 | 1.49023 | 57.45 | resin |
| *8 | −10.1533 | | | | |

*indicates an aspherical surface

TABLE 4B

Example 4 Aspherical Coefficients

Surface No. *7

| | |
|---|---|
| KA | 1.49776E+02 |
| A4 | −2.05036E−04 |
| A6 | 5.62196E−06 |
| A8 | −7.13615E−08 |
| A10 | 3.53220E−10 |

Surface No. *8

| | |
|---|---|
| KA | 6.01854E−01 |
| A4 | −6.70055E−05 |
| A6 | 3.36407E−06 |
| A8 | −4.23733E−08 |
| A10 | 2.34321E−10 |

TABLE 4C

Example 4 Values Relating to Conditional Expressions, etc.

| Conditional Expression | Mathematical Expression/Variable | Value |
|---|---|---|
| (1) | f1/f3 | 1.351928 |
| (2) | TL | 12.94175 |
| (3) | f | 20.79459 |
| (4) | 2ω | 32.52 |
| (5) | (r5 + r6)/(r5 − r6) | 0.843979 |
| (6) | (r3 + r4)/(r3 − r4) | −3.26394 |
| (7) | N2 | 1.84666 |
| — | f1 | 26.24019 |
| — | f2 | −25.289 |
| — | f3 | 19.40946 |
| — | Yt | 6 |
| — | EPL | 20.7 |

As can be seen from the above-described lens data, etc., the eyepiece optical system of Example 4 also accomplishes a compact eyepiece optical system with a wide angle of view and suppressed aberrations.

While the present invention has been described with reference to the embodiment and the examples, the invention is not limited to the above-described embodiment and examples, and various modifications may be made to the invention. For example, values of the radius of curvature, the surface interval, the refractive index, the Abbe number, etc., of each lens element are not limited to the values shown in the above-described numerical examples and may take different values.

What is claimed is:

1. An eyepiece optical system substantially consisting of, in order from an object side:

a first lens having a positive refractive power with an observation-side lens surface being a convex surface;
a second lens having a negative refractive power and having a meniscus shape with a concave surface facing the object side; and
a third lens having a positive refractive power with an observation-side lens surface having a smaller radius of curvature than a radius of curvature of an object-side lens surface,
wherein each of the first lens, the second lens and the third lens consists of a single lens, and
the conditional expressions (1), (2) and (3) below are satisfied at the same time:

$$0.9<f1/f3<5.0 \quad (1),$$

$$10.0<TL<17.0 \quad (2), \text{ and}$$

$$15.0<f<25.0 \quad (3),$$

where f1 is a focal length of the first lens, f3 is a focal length of the third lens, f is a focal length of the entire lens system, and TL is a distance along an optical axis from an object-side lens surface of the first lens to the observation-side lens surface of the third lens, and
wherein the conditional expression (4) below is satisfied:

$$30.0°<2\omega \quad (4),$$

where 2ω is a maximum angle of view at a total angle of view.

2. The eyepiece optical system as claimed in claim 1, wherein the conditional expression (1') below is satisfied:

$$1.0<f1/f3<2.0 \quad (1').$$

3. The eyepiece optical system as claimed in claim 2, wherein the conditional expression (5) below is satisfied:

$$0.5<(r5+r6)/(r5-r6)<1.1 \quad (5),$$

where r5 is a radius of curvature of the object-side lens surface of the third lens, and r6 is a radius of curvature of the observation-side lens surface of the third lens.

4. The eyepiece optical system as claimed in claim 2, wherein the observation-side lens surface of the third lens has such an aspherical surface shape that the positive refractive power is weaker at a position farther away from the optical axis passing through the third lens in a direction orthogonal to the optical axis.

5. The eyepiece optical system as claimed in claim 2, wherein the conditional expression (6) below is satisfied:

$$-6.0<(r3+r4)/(r3-r4)<-2.3 \quad (6),$$

where r3 is a radius of curvature of the object-side lens surface of the second lens, and r4 is a radius of curvature of an observation-side lens surface of the second lens.

6. The eyepiece optical system as claimed in claim 2, wherein the conditional expression (7) below is satisfied:

$$1.80<N2 \quad (7),$$

where N2 is a refractive index of the second lens.

7. The eyepiece optical system as claimed in claim 1, wherein the conditional expression (6) below is satisfied:

$$-6.0<(r3+r4)/(r3-r4)<-2.3 \quad (6),$$

where r3 is a radius of curvature of the object-side lens surface of the second lens, and r4 is a radius of curvature of an observation-side lens surface of the second lens.

8. The eyepiece optical system as claimed in claim 7, wherein the conditional expression (6') below is satisfied:

$$-5.0<(r3+r4)/(r3-r4)<-3.0 \quad (6').$$

9. The eyepiece optical system as claimed in claim 1, wherein the conditional expression (7) below is satisfied:

$$1.80<N2 \quad (7),$$

where N2 is a refractive index of the second lens.

10. The eyepiece optical system as claimed in claim 9, wherein the conditional expression (7') below is satisfied:

$$1.90<N2 \quad (7').$$

11. The eyepiece optical system as claimed in claim 1, wherein the conditional expression (5) below is satisfied:

$$0.5<(r5+r6)/(r5-r6)<1.1 \quad (5),$$

where r5 is a radius of curvature of the object-side lens surface of the third lens, and r6 is a radius of curvature of the observation-side lens surface of the third lens.

12. The eyepiece optical system as claimed in claim 11, wherein the conditional expression (5') below is satisfied:

$$0.6<(r5+r6)/(r5-r6)<0.9 \quad (5').$$

13. The eyepiece optical system as claimed in claim 11, wherein the observation-side lens surface of the third lens has such an aspherical surface shape that the positive refractive power is weaker at a position farther away from the optical axis passing through the third lens in a direction orthogonal to the optical axis.

14. The eyepiece optical system as claimed in claim 1, wherein the observation-side lens surface of the third lens has such an aspherical surface shape that the positive refractive power is weaker at a position farther away from the optical axis passing through the third lens in a direction orthogonal to the optical axis.

15. An eyepiece optical system substantially consisting of, in order from an object side:
a first lens having a positive refractive power with an observation-side lens surface being a convex surface;
a second lens having a negative refractive power and having a meniscus shape with a concave surface facing the object side; and
a third lens having a positive refractive power with an observation-side lens surface having a smaller radius of curvature than a radius of curvature of an object-side lens surface,
wherein each of the first lens, the second lens and the third lens consists of a single lens, and
the conditional expressions (1), (2) and (3) below are satisfied at the same time:

$$0.9<f1/f3<5.0 \quad (1),$$

$$10.0<TL<17.0 \quad (2), \text{ and}$$

$$15.0<f<25.0 \quad (3),$$

where f1 is a focal length of the first lens, f3 is a focal length of the third lens, f is a focal length of the entire lens system, and TL is a distance along an optical axis from an object-side lens surface of the first lens to the observation-side lens surface of the third lens,
wherein the conditional expression (7) below is satisfied:

$$1.80<N2 \quad (7),$$

where N2 is a refractive index of the second lens.

* * * * *